2,950,315
Patented Aug. 23, 1960

2,950,315
PRODUCTION OF 3,5-DIIODOTHYRONINE

Paul Z. Anthony, Morton Grove, Ill., assignor to Baxter Laboratories, Inc.

No Drawing. Filed June 18, 1956, Ser. No. 591,797

6 Claims. (Cl. 260—519)

This invention relates to a process for producing 3,5-diiodothyronine, and more particularly, a process involving the deiodination of thyroxine.

The reaction contemplated by this invention involves the following step:

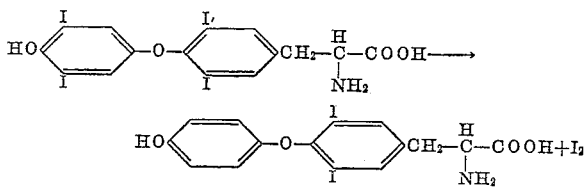

From the above it is to be noted that 3,5-diiodothyronine differs from thyroxine in that it does not possess iodine atoms in the 3' and 5' positions. 3,5-diiodothyronine is an extremely useful chemical intermediate in that it can be monoiodinated in the 3' position to produce triiodothyronine. Triiodothyronine is a composition only recently recognized as being a product very important in stimulating metabolism. In contradistinction to thyroxine, its action is extremely rapid, but of quite short duration. Thus, it is a very desirable adjunct to recognized thyroid therapy. In the past, triiodothyronine has been produced by monoiodinating 3,5-diiodothyronine, the diiodothyronine being obtained by a sequence of involved chemical reactions. This invention describes a pathway to triiodothyronine from the thyroid hormone, thyroxine.

The essential operative steps of my invention include suspending the thyroxine (such as the commercially available monosodium salt) in a concentrated hydriodic acid solution, for which I prefer to use the 57% commercially available form which has a constant boiling temperature (approximately 125° C.), refluxing the suspension for about one to three hours until a clear solution is achieved, treating with an appropriate reducing agent to remove excess iodine and adjusting the pH to about 4.0 to precipitate the diiodothyronine. Purification is achieved by dissolving the resultant product in boiling 2 N hydrochloric acid in which thyroxine is insoluble. At this point, monoiodination can be performed to convert the diiodothyronine to triiodothyronine as described in prior art. In a typical experiment I found that the triiodothyronine so obtained had an M.P. of 200–203° C., nitrogen content of 2.16% (calcd. 2.04%) and $$[\alpha]_D^{26} = +21.2°$$

(c. 4, 1 N HCl—EtOH, 1:2).

The process of my invention relating to deiodination involves heating a suspension of thyroxine in hydriodic acid not substantially longer than is necessary to remove the iodine atoms from the 3' and 5' positions. If the reaction mixture is treated excessively, that is, for a period of as long as 12 hours, complete removal of iodine will result. Optimal results are obtained when 57% hydriodic acid is used.

A typical laboratory procedure involving the process of my invention is set forth below, entitled Example I. Inasmuch as the levo isomer of thyroxine and triiodothyronine are the physiologically active forms, I have chosen that form of thyroxine for the following examples.

Example I

An 889 mg. portion of sodium L-thyroxine hydrate (corresponding to 1/1000 of a mole) was suspended in 15 ml. of concentrated hydriodic acid (57%). It is to be understood that this thyroxine salt is immediately hydrolyzed into thyroxine, the sodium salt being used because of its commercial availability. The suspension so achieved was refluxed for one and one-half hours. The resulting clear solution was diluted with 15 ml. of H₂O, treated with NaHSO₃ solution to remove free iodine, and neutralized to Congo red end point (pH approximately 4) with sodium hydroxide solution, a white solid precipitating. The mixture was refrigerated after which the solid was collected by centrifugation, washed with H₂O and then dissolved in 4 ml. of boiling 2 N HCl. Upon cooling a white crystalline solid appeared. After refrigeration the solid was collected by filtration, washed with H₂O and dried. The yield of 3,5-diiodothyronine hydrochloride was 250 mg. (44.5% of theoretical); M.P. 235–240°.

Example II

To test larger scale production, a 35.56 gram portion of sodium L-thyroxine hydrate (corresponding to 0.04 mole) was suspended in 600 ml. of 57% hydriodic acid and refluxed for two and ¾ hours. After purification as given above, a yield of 12.78 grams of 3,5-diiodothyronine hydrochloride was obtained which corresponds to 57% of the theoretical yield, the product having an M.P. of 243–246°.

The foregoing detailed description has been given for clearness of understanding only and no unnecessary limitations are to be inferred therefrom. Although the examples have been restricted to the L-isomer of thyroxine it is apparent to those skilled in the art that this method is operable with the D- and DL- forms of thyroxine with equivalent results.

I claim:

1. A process for producing 3,5-diiodothyronine from thyroxine comprising refluxing a suspension of thyroxine in a concentrated solution of hydriodic acid.

2. The process of claim 1 wherein the time of refluxing is not substantially more than is required to produce a clear solution.

3. A process for the production of 3,5-diiodothyronine from thyroxine comprising suspending thyroxine in a solution of hydriodic acid, the concentration of hydriodic acid approximating that of the constant boiling solution of hydriodic acid, and refluxing the suspension so achieved for about 1 to 3 hours.

4. A process for the production of 3,5-diiodothyronine from thyroxine comprising suspending thyroxine in a solution of about 57% hydriodic acid, refluxing the suspension so achieved for about 1 to 3 hours until a clear solution results, and recovering 3,5-diiodothyronine from said solution.

5. A process for the production of 3,5-diiodothyronine from thyroxine comprising the steps of reacting thyroxine with hydriodic acid to remove two iodine atoms from said thyroxine, adjusting the pH of the reaction mixture to about 4 to precipitate 3,5-diiodothyronine, and separating the 3,5-diiodothyronine from the reaction mixture.

6. A process for the production of 3,5-diiodothyronine from thyroxine, comprising suspending thyroxine in a solution of hydriodic acid, the concentration of hydriodic acid approximating that of the constant boiling solution of hydriodic acid, and refluxing the suspension so achieved until a clear solution results.

References Cited in the file of this patent

Sprott et al.: Biochem. Journal, vol. 59, pp. 288–94 (1955).